July 28, 1959
R. C. NORRIE
2,896,469
LOW-PROFILE SHIFT LINK FOR CAB-OVER-ENGINE VEHICLE
Filed Feb. 3, 1958
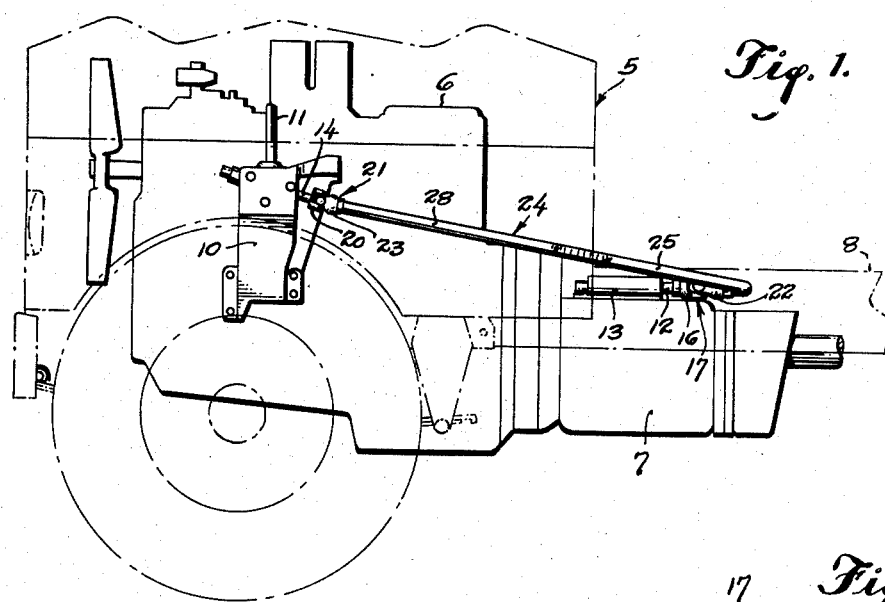
Fig. 1.
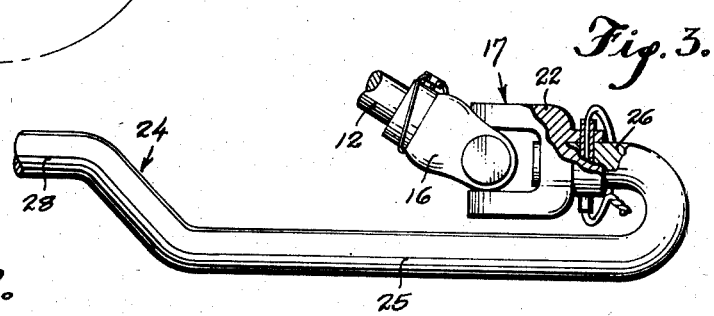
Fig. 3.
Fig. 2.
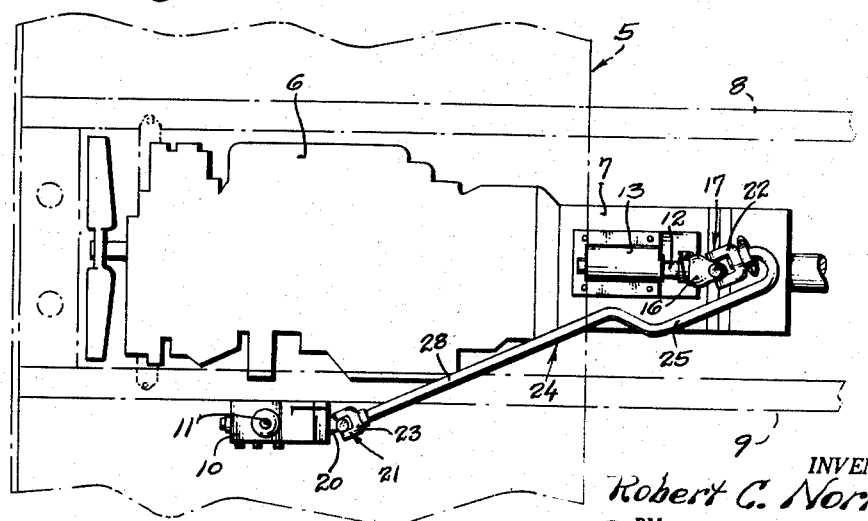
INVENTOR.
Robert C. Norrie
BY
Barnes & Seel
atty's.

United States Patent Office 2,896,469
Patented July 28, 1959

2,896,469

LOW-PROFILE SHIFT LINK FOR CAB-OVER-ENGINE VEHICLE

Robert C. Norrie, Seattle, Wash., assignor to Pacific Car and Foundry Company, Seattle, Wash., a corporation of Washington Application February 3, 1958, Serial No. 713,004

3 Claims. (Cl. 74—473)

This invention relates to remotely controlled manually activated gear-shifting mechanisms for the change-speed transmissions of automotive trucks and tractors, particularly transmissions characterized in that the gear sets are selected by a responder bar surmounting the transmission case and journaled for both endwise and rocker motion about a longitudinally disposed horizontal axis. The automotive vehicle to which the present invention especially lends itself is of the cab-over-engine type. Cab-over-engine trucks and tractors locate the transmission immediately to the rear of the engine and mechanical motions for shifting the transmission must thus be passed both rearwardly and inwardly to the shuttle bar in that the shift lever, exposed to use by the driver from the latter's station within the cab, lies to one side of the engine and well to the front of the transmission.

For its general object, the present invention aims to provide a perfected mechanical link for passing directly to a transmission-controlling responder bar located to the rear of the vehicle engine change-speed shift motions given by a manually controlled shift lever to an impulse bar located to one side of the engine, a link, more especially, in which each of the motions passed thereby to the responder bar is an exact counterpart of the motion given by the shift lever to the impulse bar.

As a further and particular object the invention purposes to provide a link which runs alongside the responder bar and connects therewith at the rear end of the bar, accomplishing the important end of maintaining a low profile.

With the above and other more particular objects and advantages in view and which will appear and be understood in the course of the following description and claims, the invention consists in the novel construction and in the adaptation and combination of parts hereinafter described and claimed.

In the accompanying drawing:

Figure 1 is a fragmentary side elevational view of an automotive vehicle having a perfected link, constructed to embody the preferred teachings of the present invention, for transferring change-speed motions from a shift lever located alongside the vehicle engine to a transmission occupying a position to the immediate rear of said engine. The vehicle cab, frame, and steerable front road wheels are shown by broken lines.

Fig. 2 is a top plan view thereof; and

Fig. 3 is a fragmentary top plan view, drawn to an enlarged scale, detailing said motion-transferring link.

Referring to said drawing, the cab of the illustrated cab-over-engine vehicle is designated by the numeral 5, and the engine by 6. 7 represents the change-speed transmission which lies to the immediate rear of the engine. The longitudinal principals 8 and 9 of a vehicle main frame give support to said engine, transmission and cab. The box 10 for a shift lever 11 also derives its support from the frame. In order that the shift lever will be located convenient to an operator occupying the driver's station within the cab said box is positioned to the left of the engine well to the front of the transmission. The transmission is of that nature in which gear selections are made by a responder bar 12 journaled in a chest 13 for rocker and endwise motion on a longitudinally disposed horizontal axis. Said chest surmounts the transmission case in close proximity to the front end of the latter. The same rotary and endwise motion to which said responder bar admits is transmitted by the shift lever 11 to an impulse bar 14 which is received in the box 10, said impulse bar occupying a longitudinally disposed generally horizontal axis with its rear end exposed.

According to the present invention the rear end of the responder bar 12 is likewise exposed, and one component 16 of a universal joint 17 is pinned or otherwise fixedly attached to this exposed rear end. A similar component 20 of a second universal joint 21 is fixedly attached to the exposed rear end of the impulse bar 14. 22 and 23 designate the components which complement said universal components 17 and 21, respectively.

A direct mechanical couple comprised of a link 24 is provided from the universal 21 at the front to the universal 17 at the rear. The significant feature of this link is that the same is formed at the rear with a yoke section 25 which extends alongside the universal 17 much in the nature of a straddling bow, with the rear end of this bow having a substantial U-shape to produce a return bend terminating in a forwardly extending shank 26. This shank is pinned fast in a mating socket presented by said component 22 of the aft universal 17. Such socket, as is usual, positions its axis so as to traverse the intersection of the two swivel axes of the concerned universal. At its front end the link 24 presents a rectilineal section 28 occupying an axis coinciding with the axis of the shank 26, and the front end of this section is fixed in a mating socket presented by the rear component 23 of the fore universal 21. Like the socket of the universal component 17, a projection of the axial line of the socket formed in said universal component 23 traverses the intersection of the two swivel axes of the concerned joint 21.

When positioned at the mid-point of the impulse bar's permitted rotary motion, the yoke section 25 of the link 24 occupies substantially the position in which it is represented in the drawings, and namely in a generally horizontal plane containing the fore section 28 and the two terminal shanks which are co-axial therewith. From this position the yoke section swings up or down as rocking impulses are transmitted from the shift lever 11 to the bar 14. Endwise impulses transmitted to said bar shift the link bodily either in a fore or an aft direction, as the case may be. All rotary and endwise motions given to the impulse bar find their counterparts in the motions passed by the link to the responder bar 12.

It will be apparent that the present invention is peculiarly applicable to close-coupled engine-transmission assemblies in which space limitations preclude any practical mechanical connection, for transmittal of gear-shifting motions, with the front end of the responder bar, and has the additional advantage of providing an unusually low profile, as distinguished from existing motion-transmitting linkages which include a tail piece overlying the responder bar.

It is thought that the invention will have been clearly understood from the foregoing detailed description of my now-preferred embodiment. Changes in the details of construction will suggest themselves and I accordingly intend that no limitations be implied and that the hereto annexed claims be given the broadest interpretation which the employed language fairly permits.

What I claim is:

1. In an automotive vehicle having a change-speed transmission with the gear sets controlled by a responder bar surmounting the transmission and journaled for rocker and endwise motions between given limits on a horizontally disposed longitudinal axis, an impulse bar lying well to the front of said transmission and journaled for rocker and endwise motions on a horizontally disposed longitudinal axis offset laterally from the axis of the responder bar, respective universal joints for said bars having a front component of each fixed to the rear end of the related bar, and a rigid rod extending as a link diagonally between the two bars and fixedly coupled by its front end with the rear component of the front universal and by its rear end with the rear component of the rear universal, said coupled ends being each pointed forwardly on a coinciding axis traversing the intersections of the swivel axes of both of the universals.

2. Structure according to claim 1, the rear portion of the link providing a yoke section which straddles the responder bar and terminates in a return bend producing said forwardly pointed end which is fixedly coupled to the rear component of the rear universal.

3. Structure according to claim 2 in which said yoke is approximately horizontally aligned with said coinciding axis of the two points of intersection when the link occupies a mean between the two limits of permitted rocker motion.

References Cited in the file of this patent

UNITED STATES PATENTS

| | | |
|---|---|---|
| 427,780 | Marsh | May 13, 1890 |
| 711,238 | Totham | Oct. 14, 1902 |
| 1,640,642 | Brown | Aug. 30, 1927 |
| 2,168,645 | Glidden | Aug. 8, 1939 |
| 2,180,116 | Lapsley | Nov. 14, 1939 |
| 2,187,658 | Lane et al. | Jan. 16, 1940 |
| 2,278,698 | Green | Apr. 7, 1942 |
| 2,540,590 | Mead et al. | Feb. 6, 1951 |